F. GRANGER.
Revolving Harrow.
No 2,395. Reissued Nov. 20, 1866.
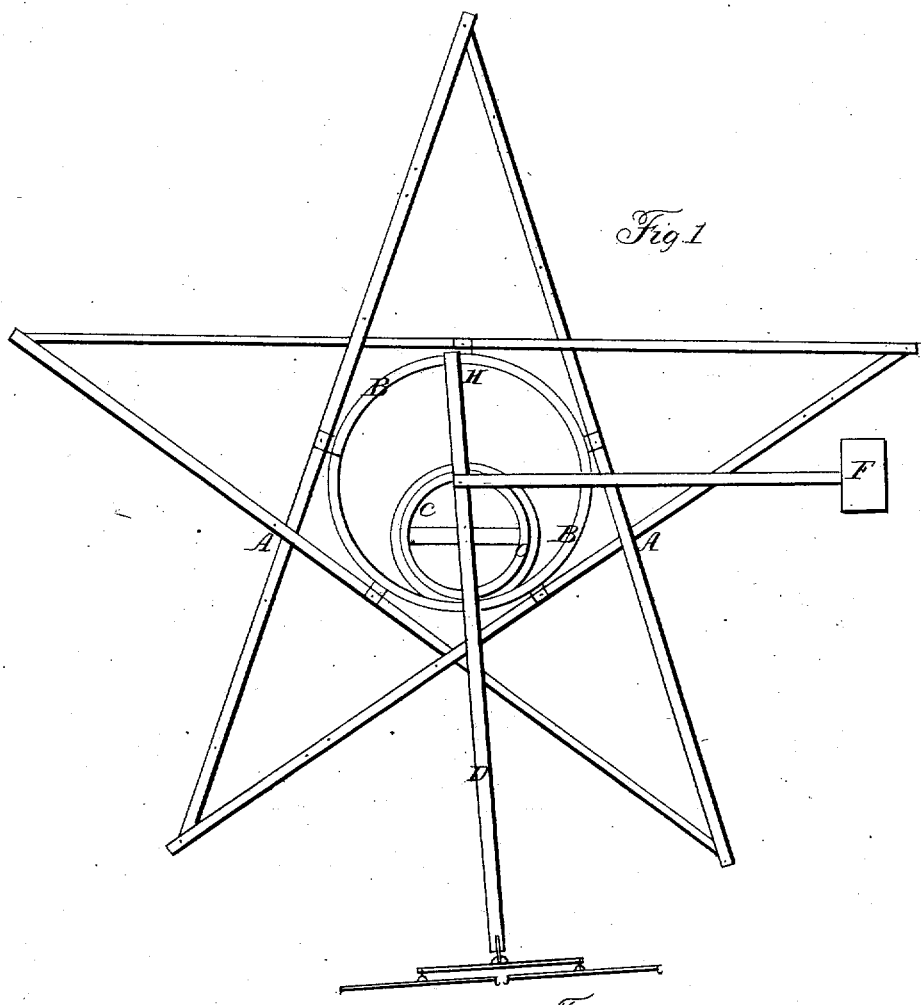
Witnesses;
Ch. Overhiser
A. S. Granger.
Inventor;
Francis Granger
N. PETERS, PHOTO-LITHOGRAPHER, WASHINGTON, D. C.

United States Patent Office.

IMPROVEMENT IN HARROWS.

FRANCIS GRANGER, OF LOCKPORT, ILLINOIS.

*Letters Patent No.* 56,405, *dated July* 17, 1866; *reissued* 2,395, *dated November* 20, 1866.

SPECIFICATION.

TO ALL WHOM IT MAY CONCERN:

Be it known that I, FRANCIS GRANGER, of the town of Lockport, in Will county, and State of Illinois, have invented a new and useful improvement on a Harrow, and I do hereby declare that the following is a full, clear, and exact description of the construction and operation of the same, reference being had to the drawings in my original application making a part of this specification:

*a* represents the main frame of the harrow, constructed of suitable pieces of timber, so arranged as to be in the form of a star with points. *b* represents a flat circle or ring of metal furnished with arms or projections to the number of timbers in the main frame, so arranged at intervals as to rest upon the centre of each piece of the main frame, to which they are firmly fastened, thus holding said ring or circle exactly in the centre of the harrow. *c* represents a friction-roller with, a flange on the lower edge projecting under the inside edge of the circle *b* for the purpose of holding said roller in its place as it rolls round on the inside edge of said circle. This roller is fastened at its centre to the arm *d*, on a pin on which it revolves. *e* represents a weight at the end of an arm for the purpose of bearing down one side of the harrow, causing greater resistance of the teeth in the earth on that side, thus causing the harrow to revolve as it passes along. To prevent friction, both arms are provided with friction-rollers, *i*, where they rest upon said circle.

Figure 2 represents an iron strap bolted to the draught arm *d* in such a manner that one end projects under said circle to keep the arm in place, while the other end is fastened to the pin which passes through the centre of the roller *c* as a means of support to that end of said pin.

What I claim as my invention, and desire to secure by Letters Patent, is—

A combination of the circle, *b*, the flanged friction-roller, *c*, the arms, *d*, *d*, the weight, *e*, and friction-rollers, *i*, arranged and operating in the manner substantially as described.

FRANCIS GRANGER.

Witnesses:

THOS. H. HUTCHINS,

WM. H. HUTCHINS.